United States Patent
Borot

(10) Patent No.: US 7,556,074 B2
(45) Date of Patent: Jul. 7, 2009

(54) TIRE HAVING A CAVITY FOR RECEIVING AN ELECTRONIC DETECTOR

(75) Inventor: Martine Borot, Cebazat (FR)

(73) Assignee: Michelin Recherche Et Technique, Granges-Paccot (CH)

( * ) Notice: Subject to any disclaimer, the term of this patent is extended or adjusted under 35 U.S.C. 154(b) by 410 days.

(21) Appl. No.: 11/083,215

(22) Filed: Mar. 18, 2005

(65) Prior Publication Data
US 2005/0217774 A1 Oct. 6, 2005

(30) Foreign Application Priority Data
Mar. 18, 2004 (FR) .................................. 04 02886

(51) Int. Cl.
*B60C 23/00* (2006.01)

(52) U.S. Cl. .................. 152/152.1; 152/510

(58) Field of Classification Search .............. 152/152.1, 152/154.1, 510
See application file for complete search history.

(56) References Cited
U.S. PATENT DOCUMENTS

| | | | |
|---|---|---|---|
| 3,930,528 A * | 1/1976 | Harrington | .................. 152/521 |
| 5,500,065 A | 3/1996 | Koch et al. | |
| 6,244,104 B1 | 6/2001 | Koch et al. | |
| 6,257,289 B1 * | 7/2001 | Tomita et al. | ............. 152/152.1 |
| 2004/0094251 A1 * | 5/2004 | Strache et al. | ............ 152/152.1 |
| 2005/0132788 A1 * | 6/2005 | Lionetti et al. | ................. 73/146 |

FOREIGN PATENT DOCUMENTS

| | | | |
|---|---|---|---|
| DE | 10209580 A1 * | 9/2003 | |
| EP | 1 318 032 | 6/2003 | |

OTHER PUBLICATIONS

Machine translation of EP 1318032, Jun. 11, 2003.*

* cited by examiner

*Primary Examiner*—Geoffrey L Knable
(74) *Attorney, Agent, or Firm*—Buchanan Ingersoll & Rooney PC

(57) ABSTRACT

A tire includes a cavity formed therein to receive a removable electronic monitoring module. A mouth of the cavity opens into the inside volume of the tire and is located along a section of a joint of a first layer formed by the assembly of rubber profiled elements adjacent to the inside volume of the tire. The joint can extend radially or circumferentially. The cavity can be formed by inserting an element into the tire body and then leaving the element in place or removing it prior to vulcanization.

15 Claims, 8 Drawing Sheets

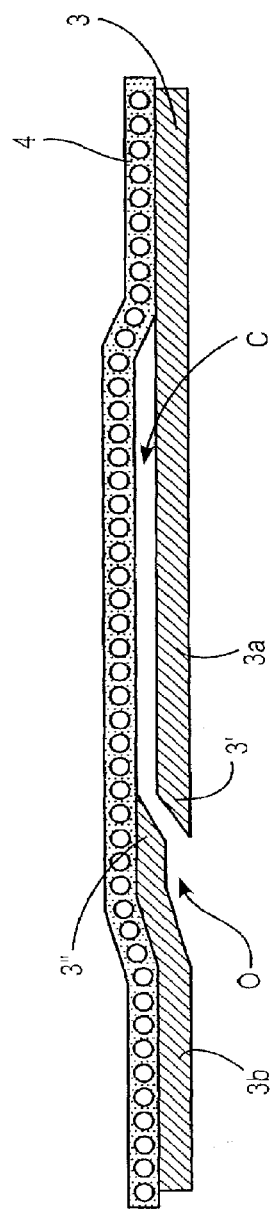
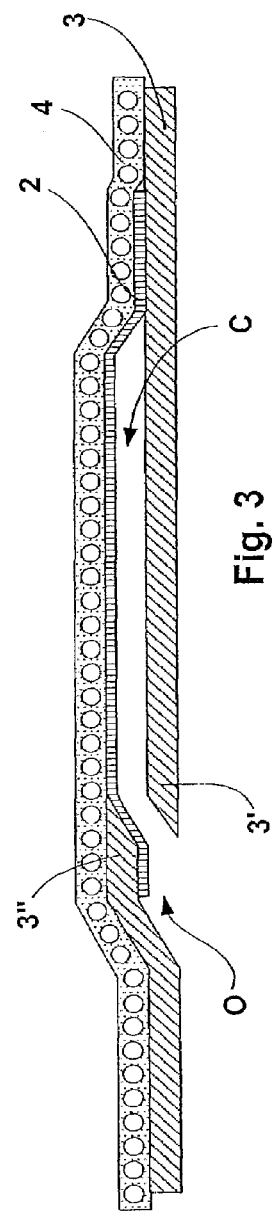
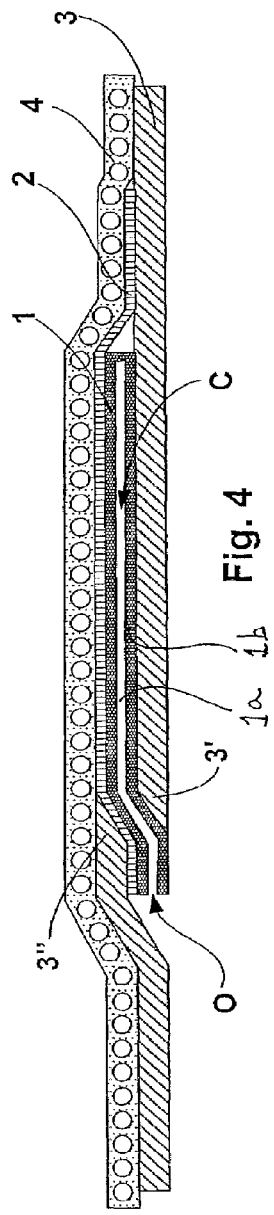
Fig. 2
Fig. 3
Fig. 4

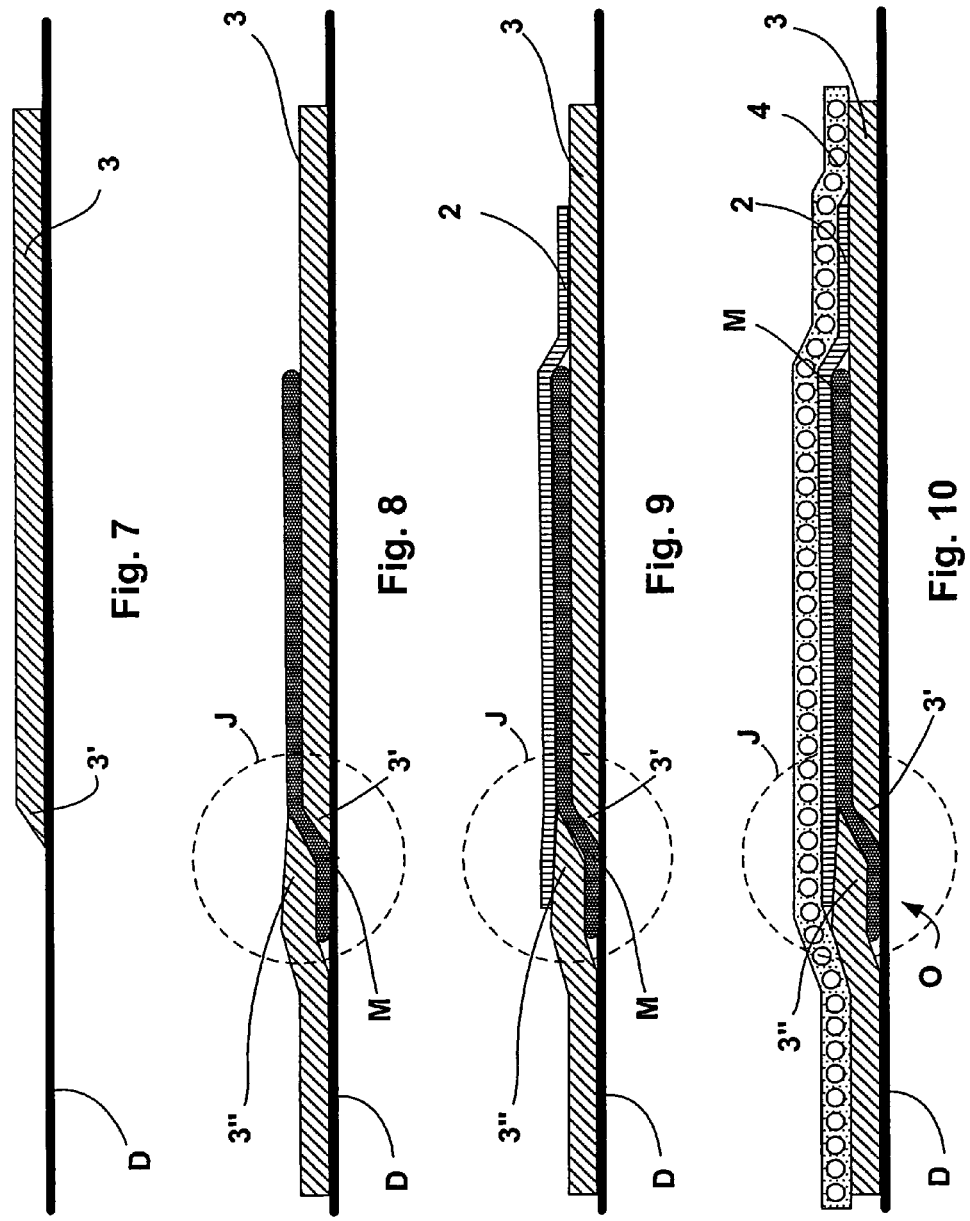

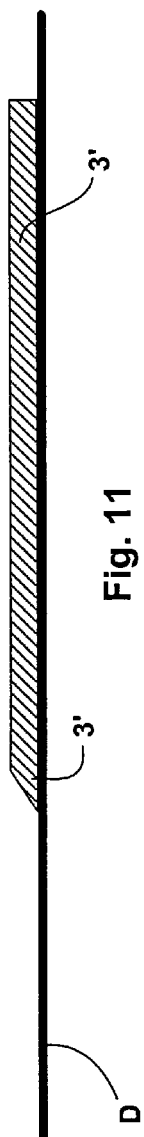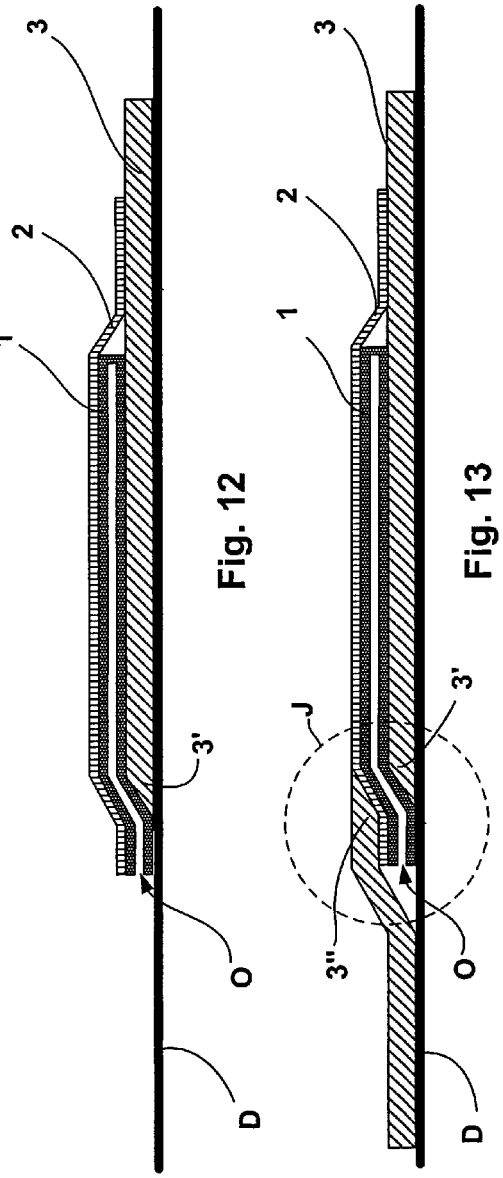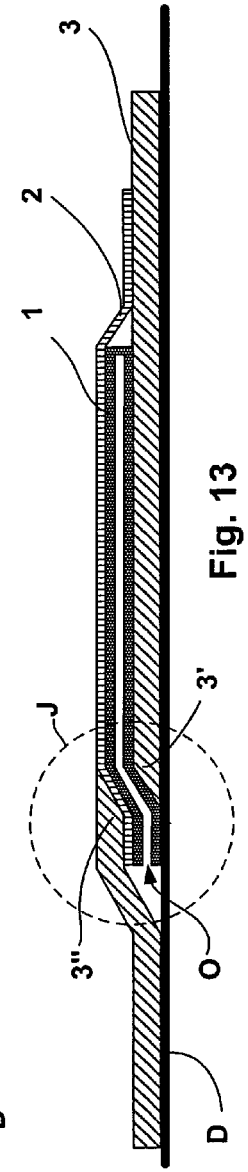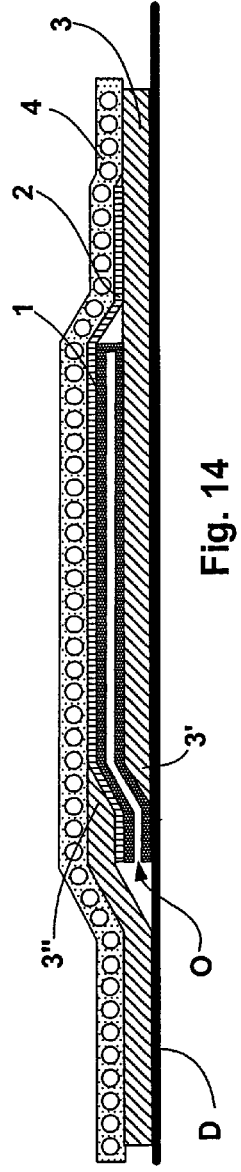

TIRE HAVING A CAVITY FOR RECEIVING AN ELECTRONIC DETECTOR

This application claims priority under 35 U.S.C. § 119 to patent application Ser. No. 04/02886 filed in France on Mar. 18, 2004.

BACKGROUND

The invention concerns a device which enables a monitoring module, generally comprising electronic elements, to be held removably on the inside surface of a tire.

The use of electronic modules in tires enables numerous applications that consist in acquiring, storing and transmitting data for the purpose of monitoring the manufacture or logistics, and more generally informing the user about the evolution of the tire's performances throughout its life.

The electronic monitoring module comprises active components connected to an autonomous electrical energy supply system such as batteries or an inductive coupling system, whose object is not part of the invention. The monitoring module is designed to exchange the desired information with an external module, which serves as the user interface, via radio waves whose frequency and power are determined by specific transmission protocols. The module is generally arranged inside a flexible or rigid protective cover intended to protect the electronic components from aggression related to shocks and the atmosphere inside the tire and its surroundings.

The monitoring module, positioned inside the cavity formed by the tire once it is fitted on the wheel, can be arranged on a large variety of supports. Thus, it can be fixed to the valve, fixed on the wheel rim, fixed or bonded to the inside wall of the tire, or even integrated in the components of the tire. The choice between one of these solutions depends on the nature of the tire and the forces to which it may be subjected, on the nature of the electronic module's energy source, on the information to be monitored and on the accessibility desired for maintenance purposes.

Solutions consisting in arranging elastic pockets on the inside wall of the tire have been described, for example in U.S. Pat. No. 5,500,065. However, they have the disadvantage of having to be positioned after the tire has been made. This entails carrying out a special process that consists in preparing the part of the surface which is to receive the support or elastic cavity and then bonding or vulcanizing the support onto the part of the surface, as described for example in U.S. Pat. No. 6,244,104.

OBJECTS AND SUMMARY OF INVENTION

The purpose of this invention is to improve the situation by proposing a tire that comprises a cavity designed to receive a monitoring module, whose production method has advantages improved by comparison with those known.

The cavity is arranged within the components of the tire, and is characterized in that the mouth of the cavity opens into the inside volume of the tire, and in that it is located on part of a butt joint of a first layer formed by the rubber profiled elements adjacent to the inside volume of the tire. The inside volume of the tire is defined by the part of the tire designed to contain the compressed air.

This configuration enables the cavity to be arranged between the first layer and a second layer formed by the rubber profiled elements having a rubber bond with the first layer.

The cavity is formed by a localized absence of rubber bonds between the first and second layers.

It then suffices, during the operations of building up the tire, to interpose an intermediate element, whether removable or intended to remain permanently, which has at least one adhesion-preventing face to prevent the formation of rubber bonds between the first and second layers at the time of vulcanizing.

BRIEF DESCRIPTION OF DRAWINGS

The description below is intended to explain non-limiting example embodiments of a tire according to the invention, with reference to the figures in which:

FIGS. 2 to 4 show cross sectional views of respective embodiments of cavity configurations and the corresponding stacking of profiled elements;

FIGS. 7 to 10 show schematic views of a particular manufacturing sequence for stacking profiled elements such that a cavity is formed;

FIGS. 11 to 14 show schematic views of another particular manufacturing sequence for stacking profiled elements such that a cavity is formed;

DETAILED DESCRIPTION OF PREFERRED EMBODIMENTS

In what follows, the same indexes will be used to denote elements having identical functions, as represented in FIGS. 1 to 21.

Figure 1:
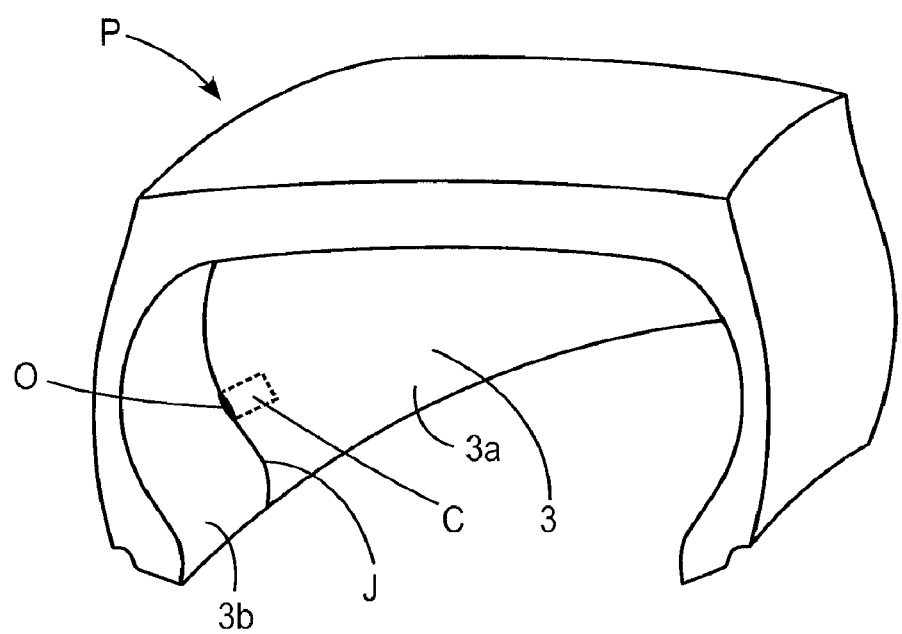
FIG. 1 shows a partial cross-section of a tire with a cavity according to the invention.

FIG. 1 shows a partial perspective view of a tire (P) with a cavity (C) whose mouth (O) opens into the inside volume of the tire and is positioned on part of a butt joint (J) of the rubber profiled element forming the first layer (3) adjacent to the inside volume of the tire.

The electronic device (not shown) is inserted directly through the opening (O). It is held fast within the cavity (C) by the elastic forces exerted by the first layer, which is tensioned by the introduction of the device into the cavity.

The modulus of elasticity and thickness of the material of which the first layer (3) consists must be chosen to enable that function. Those with knowledge of the field will have no difficulty in determining these values in accordance with the position of the cavity and the nature of the material constituting the first layer at that precise location.

The dimensions of the cavity are adjusted to those of the electronic device to be inserted therein.

FIG. 1 shows a tire in which the orientation of the butt joint (J) of the profiled element constituting the first layer (3) is substantially radial. Note that the invention can be implemented just as well with an angular orientation of the butt joint (J) of the rubber profiled element forming the first layer (3) which is different from the radial orientation, and which can be anywhere between 0° and 90° relative to the circumferential direction. Alternatively, the cavity could be disposed in the crown and oriented transversely (e.g., perpendicularly) to the circumferential direction.

Similarly, the radial position of the cavity can be chosen anywhere between the bead heel zone containing the bead wires that reinforce the lower area and the inner crown of the tire (P) which is the part located under its crown. Nevertheless, the position chosen should be compatible with the functional forces on the area in question during the use of the tire.

FIG. 2 shows a sectional view of a simplified embodiment of a cavity according to the invention, in which the cavity (C) is formed by a local absence of rubber bonds between the first layer (3) and the second layer (4). The mouth (O) of the cavity (C) is positioned on part of a weld joint between the lips (3') and (3") of the first layer.

In a first example application for tires that need several layers of airtight materials, the first and second layers can consist of the same material.

In a second example application, the first layer can consist of an airtight material and the second layer consists of the reinforcement ply.

Under these conditions, and so as to improve the overall air-tightness of the tire, it can be advantageous, as shown in FIG. 3, to arrange a backing layer (2) formed from a material with airtight properties similar to the material constituting the first layer (3), and with an inner and an outer face, the backing layer (2) forming a rubber bond with the second layer (4) all over its inner face, and with part of its outer face adjacent to the cavity (C). The "outer" face of the layers is defined as the face directed towards the inside volume of the tire and the inner face is the face directed towards the opposite side.

It is in effect advisable to provide a backing layer (2) whose length and width are slightly larger than the length and width of the cavity (C), so as to ensure proper air-tightness at the edges of the cavity (C) by virtue of the rubber bonds formed between the part of the outer face of the backing layer (2) which is not adjacent to the cavity (C) and the first layer (3).

Similarly, to strengthen the protection of the cavity's surface and avoid degradations caused by friction between the detector module and the walls of the cavity, it may be useful to arrange a protection layer (1) on the walls of the cavity (C), as shown in detail in FIG. 4.

This protection layer will consist of two layers of an extensible material. As non-limiting examples, the material can be chosen from among elastic materials such as rubber or by selecting a woven or non-woven fabric base suitable for the purpose. The extensible material is designed to adhere to the first layer (3), and to the second layer (4) or the backing layer (2), and the cavity (C) is then formed between the two protection layers.

Figure 5:
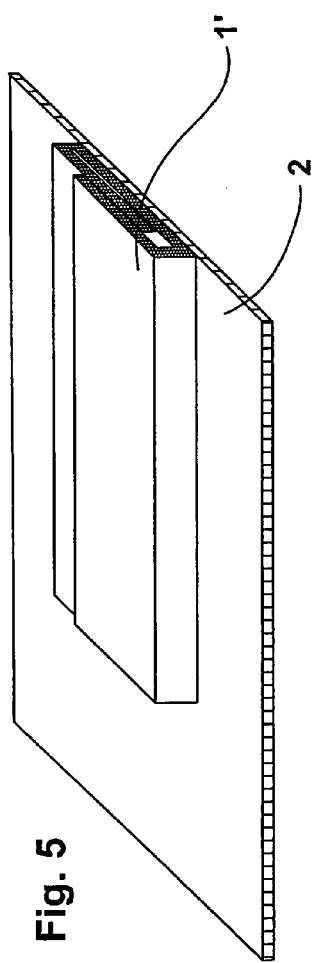
FIG. 5 shows a schematic perspective view of a particular arrangement of an intermediate element designed to stay in the tire.
Figure 6:
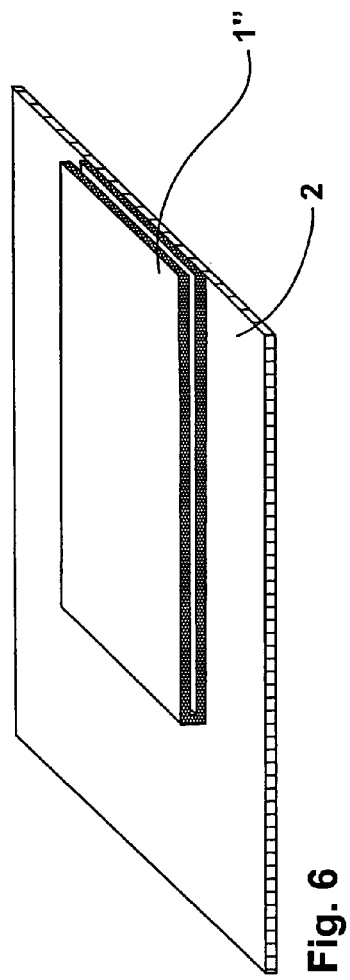
FIG. 6 shows a schematic perspective view of another particular arrangement of an intermediate element designed to stay in the tire.

FIGS. 5 and 6 show two respective embodiments of the protection layer (1) made from a woven fabric folded over itself in the longitudinal direction (1'), as shown in FIG. 5, or in the transverse direction (1"), as shown in FIG. 6. For detectors of substantial size, bellows can be positioned in the lateral positions or in the part opposite the opening (O) so as to increase the inside volume of the cavity.

In each of the configurations of cavities (C) described above, the cavity (C) is formed by a localized absence of rubber bonds between the first layer (3) and the second layer (4) or backing layer (2), or between the protection layers themselves. To obtain that particular effect at that precise position in the tire, several techniques can be used.

A first technique consists, during the build-up of the tire, in using a brush or spray to deposit an adhesion-preventing product locally on the first layer (3) and on the lip portion (3'), at the position where it is desired to arrange the cavity (C) and its mouth (O). This adhesion-preventing product can consist for example of a silicone based solution whose effect is to prevent the formation of rubber bonds in that area at the time of vulcanization.

The production of the tire comprises the following steps:
the first part (3a) of a section of a first layer (3) consisting of the assembly of rubber profiled elements adjacent to the inside volume of the tire (P), and whose edge has a first lip (3') of a butt joint (J), is placed on a building drum (D),
an adhesion-preventing product is deposited locally on the area of the first part of the first layer (3) intended to delimit the cavity (C) and on the adjacent part of the lip (3'),
the positioning of the section of the first layer is completed by putting in place the second part (3b) of that section, which comprises a second lip (3") of the butt joint (J), the first lip (3') and the second lip (3") of the butt joint (J) are brought together,
a second layer (4) consisting of the assembly of rubber profiled elements that will form a rubber bond to the first layer, is put in place on the first layer 3,
the positioning of the rubber profiled elements that form the tire is continued and completed,
the thus-formed non-vulcanized tire is vulcanized in a curing press.

The presence of the adhesion-preventing product prevents the formation of rubber bonds between the first and second layers, locally at the precise place where the cavity (C) is to be formed, and the deposition of the adhesion-preventing composition on the lip enables the opening (O) to be produced at the level of the cavity (C). From FIGS. 1, 17 and 20 it can be seen that the length of the mouth or opening (O) (i.e., the length alone the joint J on which the adhesion-preventing material was placed), is less than the remaining length of the joint.

The presence of the adhesion-preventing product prevents the formation of rubber bonds between the first and second layers, locally at the precise place where the cavity (C) is to be formed, and the deposition of the adhesion-preventing composition on the lip enables the opening (O) to be produced at the level of the cavity (C).

An alternative to depositing an adhesion-preventing solution is to position a removable intermediate element (M) designed to prevent the local formation of rubber bonds at the level of the cavity (C) and its mouth (O), and whose method of use is shown in FIGS. 7 to 10. This intermediate element can consist of a silicone-based material, or can be covered by an adhesion-resistant coating such as a coating based on polytetrafluoroethylene of the Teflon® type marketed by the company Du Pont de Nemours.

The process then comprises the following stages:
the first part of a section of a first layer (3) consisting of the assembly of rubber profiled elements adjacent to the inside volume of the tire (P), and whose edge has a first lip (3') of a butt joint (J), is placed on a building drum (D),
a removable intermediate element (M), both of whose faces are covered with an adhesion-preventing material, is positioned over the area of the first part of the section intended to delimit the cavity (C) and over the adjacent lip (3'), the positioning of the section of the first layer is completed by putting in place the second part of that section, which comprises a second lip (3"), the first lip (3') and the second lip (3") are brought together along the length of the butt joint (J) except for the part covered by the intermediate patch (M), a second layer (4) consisting of the assembly of rubber profiled elements that will form a rubber bond to the first layer, is put in place, the positioning of the rubber profiled elements that form the tire is continued, the thus-formed non-vulcanized tire is vulcanized, the intermediate element (M) is withdrawn from the cavity (C) through the opening (O).

Another alternative is to position an intermediate element which is intended to remain permanently in the tire and serve as a protection layer (1). As already mentioned, the element can consist of two layers of extensible material or one layer folded over itself, whose opposing faces 1a, 1b in contact are covered with an adhesion preventing product (1', 1").

The process then comprises the following stages:

the first part 3a of a section of a first layer (3) consisting of the assembly of rubber profiled elements adjacent to the inside volume of the tire (P), and whose edge has a first lip (3') of a butt joint (J), is placed on a building drum (D), an intermediate element (1, 1', 1") consisting of two layers of an extensible material, both of whose faces in contact are covered with an adhesion preventing material, is positioned over the area of the first part of the section intended to delimit the cavity (C) or on the adjacent lip (3'), the positioning of the section of the first layer is completed by putting in place the second part 3b of that section, which comprises a second lip (3"), the first lip (3') and the second lip (3") are brought together along the length of the butt joint (J) except for the part covered by the intermediate patch (M), a second layer (4) consisting of the assembly of rubber profiled elements that will form a rubber bond to the first layer, is put in place, the positioning of the rubber profiled elements that form the tire is continued,—the tire is vulcanized.

The rubber profiled element constituting the backing layer (2) can be positioned either before bringing the lips together and just after the intermediate element has been positioned, as illustrated in FIGS. 11 to 14, or after the lips have been brought together, as illustrated in FIGS. 7 to 10, where it is suggested that the profiled element forming the backing layer (2) and the intermediate element forming the protection layer and the backing layer are pre-assembled.

A tire according to the invention is generally produced on a cylindrical or toroidal mould onto which are deposited circumferentially the sections of rubber profiled elements constituting the tire.

Figure 15:
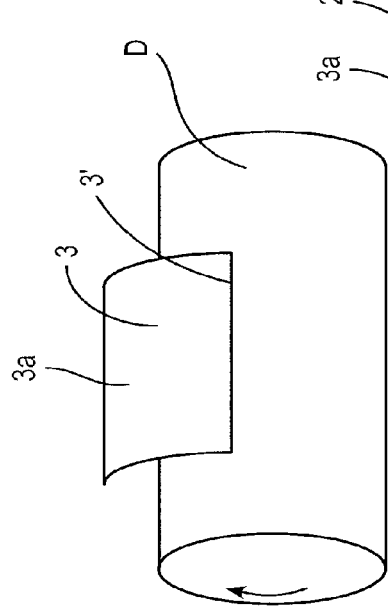
FIGS. 15 to 17 show schematic perspective views of the production stages of a tire during the stacking of a first type of profiled elements such that a cavity is formed.
Figure 16:
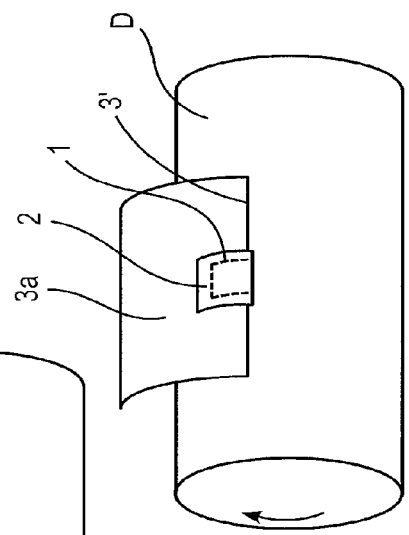
Figure 17:
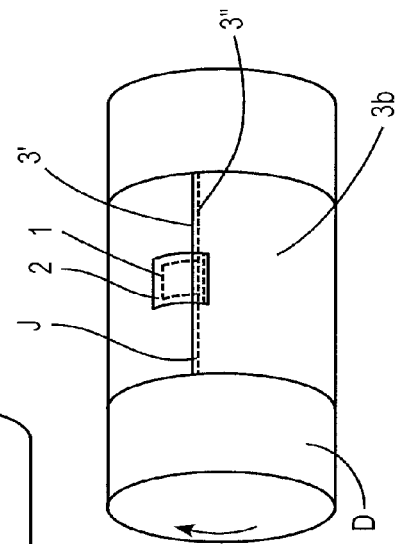

For illustrative purposes, FIG. 15 shows a schematic perspective view of the positioning onto a cylindrical drum (D), of the first part 3a of the section of the first layer (3), which has a first lip (3'). FIG. 16 illustrates the positioning of the intermediate element (1) and the backing layer (2), and FIG. 17 illustrates the completion of the stage that consists in bringing together the two lips (3') and (3"). The first and second parts 3a, 3b could comprise separate elements, or they could be integral parts of a single element.

However, the invention can also be implemented by a process in which the rubber profiled elements are positioned in the form of coiled strips.

Figure 18:
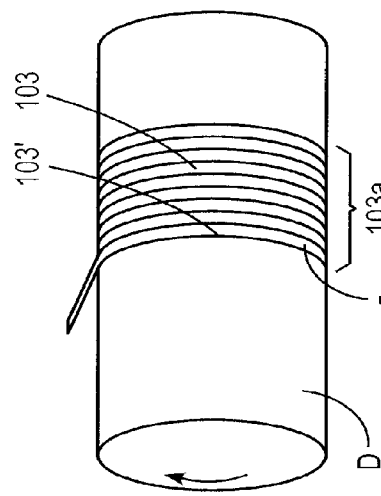
FIGS. 18 to 20 show schematic perspective views of the production stages of a tire during the stacking of a second type of profiled elements such that a cavity is formed.
Figure 19:
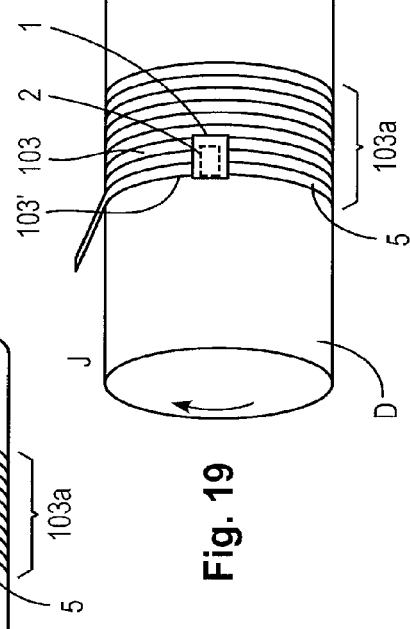
Figure 20:
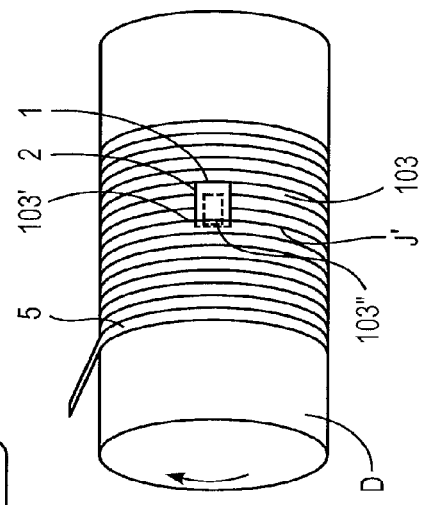

Thus, FIG. 18 shows a schematic perspective view of the positioning onto a cylindrical drum (D), of the first part (103a) of a section of the first layer (103) which has a first lip (103'). FIG. 19 illustrates the stage consisting in the positioning of the intermediate element (1) and the backing layer FIG. 20 illustrates the completion of the stage consisting in the deposition of the section of the first layer onto the drum (D) after having brought together the two lips (103' and 103") of the two touching turns that form the joint intended to contain the mouth (0) of the cavity (C). FIGS. 18, 19 and 20 illustrate the positioning of a coiled strip onto a cylindrical drum. In this case, the butt joint J' extends circumferentially on the tire.

It goes without saying that the drum could just as well be replaced by a support having the shape of the tire's inside volume.

Figure 21:
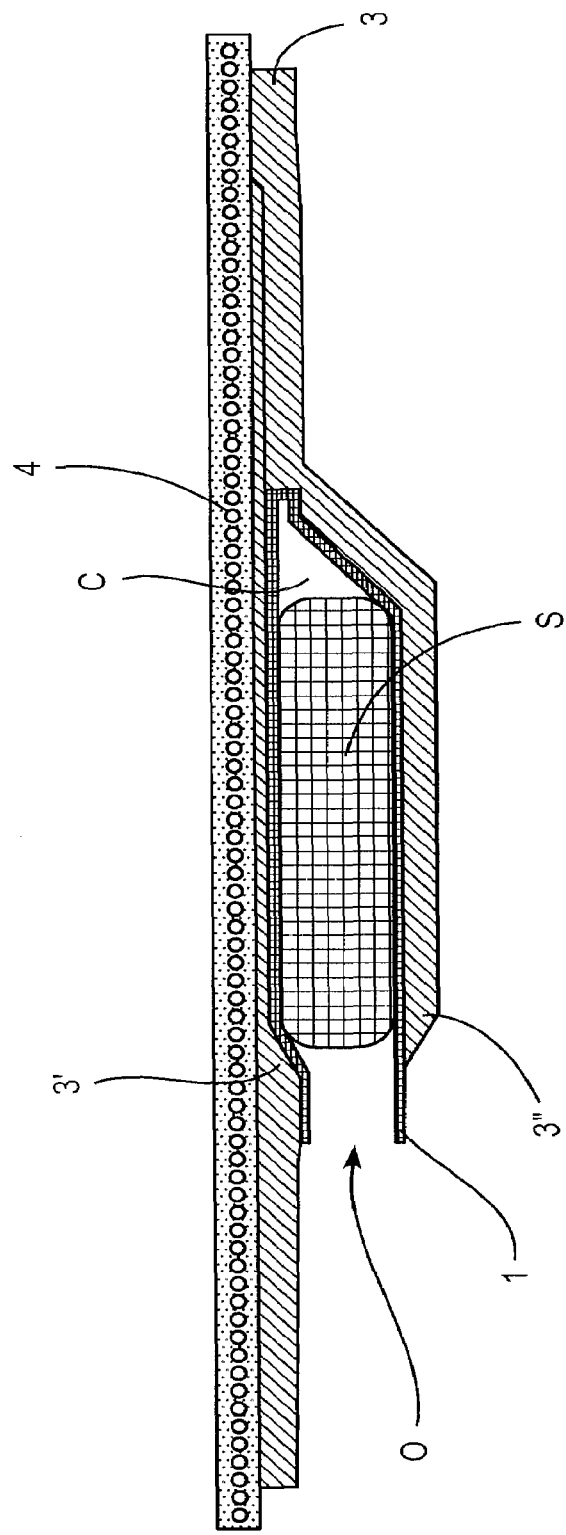
FIG. 21 shows a schematic view of a monitoring module arranged in the cavity according to the invention.

FIG. 21 shows a cross-section of the situation in which a detector (S) is arranged in the cavity (C).

Note that this invention provides a number of specific advantages related to the method of its implementation.

A first advantage is that some of the disadvantages of creating pockets arranged directly on the inside surface of the tire are avoided. In effect, it is found that in that precise case the pocket tends to be displaced by the curing membrane when the latter is expanded in the press, which results in adhesion failures and production defects.

Moreover, the stages of preparing the surface intended to receive the pocket are avoided, and this saves appreciable time during the production of the tire.

A second advantage concerns the great ability of tires produced by the method of the invention to undergo successive retreading operations without the need to prepare the inside surface of the tire so as to remove supports arranged on the internal surface to hold a removable monitoring device, which can damage the curing membrane during the vulcanization operation.

What is claimed is:

1. A tire comprising a first layer forming the inner liner of said tire adjacent to the inside volume of said tire and resulting during the build up of the tire before vulcanization, said inner liner having a first lip and a second lip arranged in mutually facing relationship to form a joint of the inner liner when bringing the first and second lips together during tire build-up, said joint being an actual joint within the inner liner layer itself, said tire including a cavity disposed between the first layer and a second layer which is bonded to the first layer on a side thereof facing away from the tire's inside volume, wherein the cavity is embedded within a body of the tire, the cavity arranged to removably receive an electronic monitoring module; the cavity having a module-receiving mouth which opens into the inside volume of the tire and which is located along an open part of the joint of said inner liner, wherein the open part of the joint is shorter than a non-open part of the joint and forms a continuation of the non-open part.

2. The tire according to claim 1, wherein the cavity is formed by a localized absence of rubber bonds between the inner liner and the second layer.

3. The tire according to claim 1, wherein rubber material forming the inner liner comprises an air-tight material.

4. The tire according to claim 1 wherein the mouth of the cavity is oriented substantially radially on the tire.

5. The tire according to claim 1 wherein the mouth of the cavity is oriented substantially circumferentially on the tire.

6. The tire according to claim 1 wherein an angular orientation of the cavity mouth relative to the tire's circumferential direction is in the range of 0° to 90°.

7. The tire according to claim 1 wherein the cavity is located radially between a bead heel and an upper crown of the tire.

8. The tire according to claim 1 further including an electronic monitoring module within the cavity.

9. The tire according to claim 1 wherein the joint is a butt joint.

10. The tire according to claim 1 wherein the tire body further comprises a backing layer disposed across the cavity and bonded to the second layer.

11. The tire according to claim 10 wherein the backing layer is formed of the same rubber material as the first layer.

12. The tire according to claim 1 wherein walls of the cavity arranged to contact an electronic monitoring device are covered by a protective layer of extensible material.

13. The tire according to claim 12 wherein the extensible material comprises a woven or non-woven fabric base.

14. The tire according to claim 12 wherein the extensible material comprises an elastomeric material.

15. A non-vulcanized rubber tire comprising a first layer forming the inner liner of said tire adjacent an inside volume of said tire and resulting during build-up of said non-vulcanized rubber tire before vulcanization, said inner liner having a pair of lips facing one another to form a joint of the inner liner, said joint being a joint within the inner liner layer itself, said tire including a cavity disposed between the first layer and a second layer bonded to the first layer on a side thereof facing away from the tire's inside volume, wherein said cavity is embedded within a body of said tire, an adhesion-preventing material disposed between portions of said lips and between said inner liner and said second layer at a location adjacent to said lips, wherein a first length of said joint provided with said adhesion-preventing material is less than a remaining second length of said joint and defines a continuation of said first length, said adhesion-preventing material being operable to prevent vulcanization and form said cavity accessible through a mouth defined by said lips and opening into the inside volume of said tire, the cavity arranged to removably receive an electronic monitoring module.

* * * * *